US012346588B2

(12) United States Patent
Tay et al.

(10) Patent No.: US 12,346,588 B2
(45) Date of Patent: Jul. 1, 2025

(54) APPARATUS WITH MEMORY CELL CALIBRATION MECHANISM AND METHODS FOR OPERATING THE SAME

(71) Applicant: Micron Technology, Inc., Boise, ID (US)

(72) Inventors: Yee Yang Tay, Singapore (SG); Lei Zhang, Singapore (SG); Steve Kientz, Westminster, CO (US); Edric Goh, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/584,993

(22) Filed: Feb. 22, 2024

(65) Prior Publication Data

US 2024/0329867 A1    Oct. 3, 2024

Related U.S. Application Data

(60) Provisional application No. 63/455,192, filed on Mar. 28, 2023.

(51) Int. Cl.
*G06F 3/00*    (2006.01)
*G06F 3/06*    (2006.01)

(52) U.S. Cl.
CPC ............ *G06F 3/064* (2013.01); *G06F 3/0604* (2013.01); *G06F 3/0629* (2013.01); *G06F 3/0679* (2013.01)

(58) Field of Classification Search
None
See application file for complete search history.

(56) References Cited

U.S. PATENT DOCUMENTS

2010/0162084 A1 *    6/2010    Coulson .............. G06F 11/1068
                                                              714/E11.034
2024/0290406 A1 *    8/2024    Bonitz ................. G11C 16/349

* cited by examiner

*Primary Examiner* — Midys Rojas
(74) *Attorney, Agent, or Firm* — Dorsey & Whitney LLP

(57) ABSTRACT

Methods, apparatuses and systems related to tracking charge loss are described. An apparatus may include a tracking mechanism configured to make direct measurements for tracking charge loss in first-type cells. The apparatus may be configured to designate a set of the first-type cells as proxy for modeling charge loss at second-type cells having a different storage density than the first-type cells. The apparatus may use the tracking mechanism to make measurements on the proxy set of the first-type cells and translate the measurement to account for the charge loss at the second-type cells.

20 Claims, 6 Drawing Sheets

| CBC | CBC VPASS | Offset L15 | Offset L14 | Offset L13 | Offset L12 | Offset L11/L10 | Offset L9/L8 | Offset L7/L6 | Offset L5/L1 | VPASS Offset |
|---|---|---|---|---|---|---|---|---|---|---|
| 0 | Value_0 | [7:0] | [7:0] | [7:0] | [7:0] | [7:0] | [7:0] | [7:0] | [7:0] | [7:0] |
| 1 | Value_1 | [7:0] | [7:0] | [7:0] | [7:0] | [7:0] | [7:0] | [7:0] | [7:0] | [7:0] |
| 2 | Value_2 | [7:0] | [7:0] | [7:0] | [7:0] | [7:0] | [7:0] | [7:0] | [7:0] | [7:0] |
| 3 | Value_3 | [7:0] | [7:0] | [7:0] | [7:0] | [7:0] | [7:0] | [7:0] | [7:0] | [7:0] |
| 4 | Value_4 | [7:0] | [7:0] | [7:0] | [7:0] | [7:0] | [7:0] | [7:0] | [7:0] | [7:0] |
| 5 | Value_5 | [7:0] | [7:0] | [7:0] | [7:0] | [7:0] | [7:0] | [7:0] | [7:0] | [7:0] |
| 6 | Value_6 | [7:0] | [7:0] | [7:0] | [7:0] | [7:0] | [7:0] | [7:0] | [7:0] | [7:0] |
| 7 | Value_7 | [7:0] | [7:0] | [7:0] | [7:0] | [7:0] | [7:0] | [7:0] | [7:0] | [7:0] |

*FIG. 3*

APPARATUS WITH MEMORY CELL CALIBRATION MECHANISM AND METHODS FOR OPERATING THE SAME

CROSS-REFERENCE TO RELATED APPLICATION(S)

The present application claims priority to U.S. Provisional Patent Application No. 63/455,192, filed Mar. 28, 2023, the disclosure of which is incorporated herein by reference in its entirety.

TECHNICAL FIELD

The disclosed embodiments relate to devices, and, in particular, to semiconductor memory devices with memory cell calibration mechanisms and methods for operating the same.

BACKGROUND

Memory systems can employ memory devices to store and access information. The memory devices can include volatile memory devices, non-volatile memory devices (e.g., flash memory employing "NAND" technology or logic gates, "NOR" technology or logic gates, or a combination thereof), or a combination device. The memory devices utilize electrical energy, along with corresponding threshold levels or processing/reading voltage levels, to store and access data. However, the performance or characteristics of the memory devices change or degrade over time, usage, and environmental conditions. The change in performance or characteristics conflicts with the threshold or processing voltage levels over time, leading to errors and other performance issues. The changed performance is further worsened as the memory devices grow denser (e.g., storing increased number bits per cell).

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 3 is an example translation mechanism in accordance with an embodiment of the present technology.

DETAILED DESCRIPTION

Figure 1:
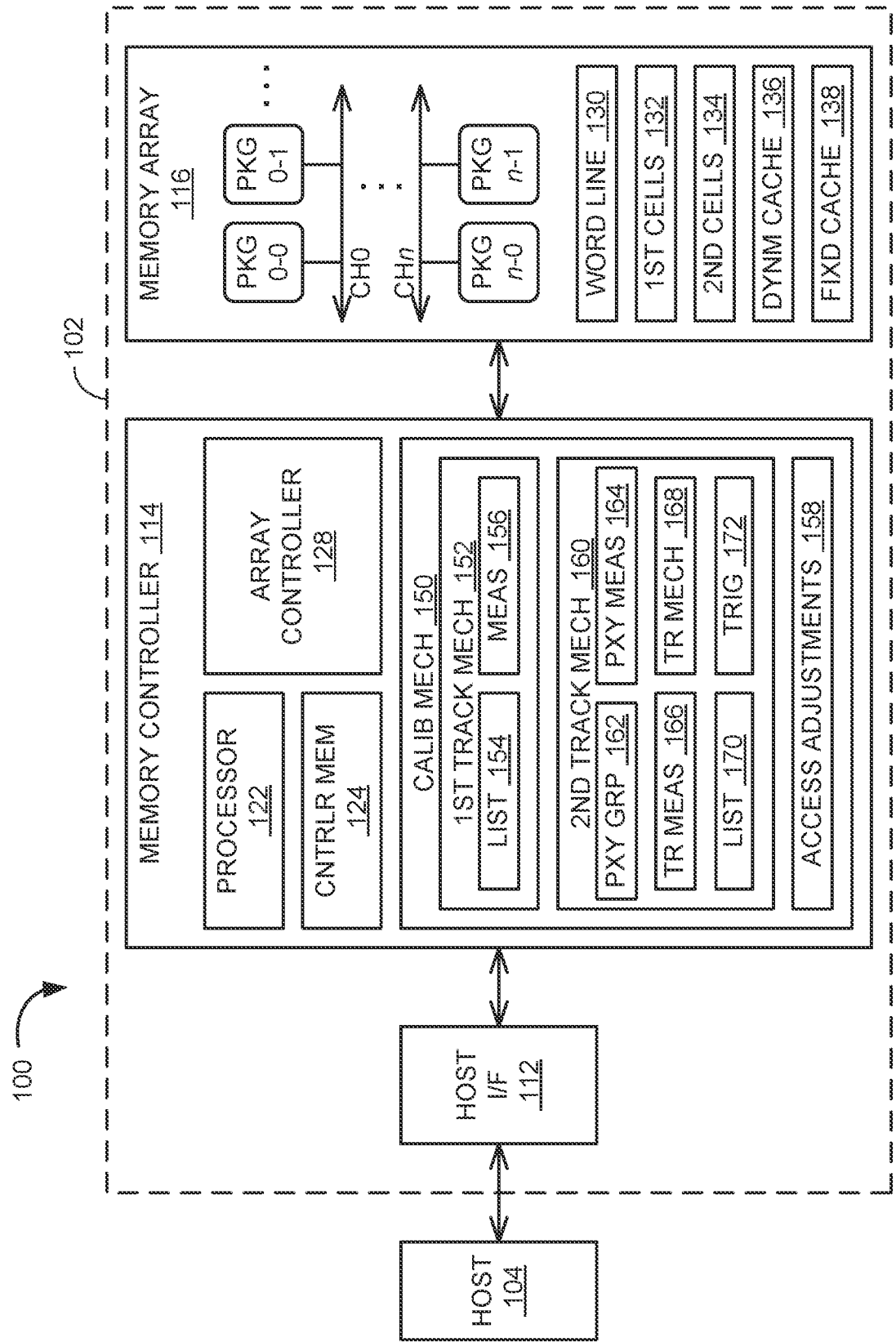
FIG. 1 is a block diagram of a computing system in accordance with an embodiment of the present technology.

As described in greater detail below, the technology disclosed herein relates to an apparatus, such as memory systems, systems with memory devices, related methods, etc., for calibrating memory cells in a device that includes multiple types of cells. The apparatus can track or measure an amount of charge loss for a first type of memory cells (e.g., higher density memory cells, such as quad-level cells (QLCs)), and use the resulting charge loss to estimate the charge loss for a second type of memory cells (e.g., lower density memory cells, such as triple-level cells (TLCs), multi-level cells (MLCs), and/or single-level cells (SLCs)).

Technological advances are allowing memory cells (e.g., NAND Flash memory cells) to store an increasing number of bits. The storage capacity for memory cells can be represented as bit(s) per cell (BPC). For example, SLCs can have 1 BPC capacity, MLCs can have 2 BPC capacity, TLCs can have 3 BPC capacity, and QLCs can have 4 BPC. Increasing the BPC can reduce the cost per bit for a given die size since more bits can be stored in a single wafer. Moreover, including cells having multiple different types or densities within one/each groupings of cells or within one device can provide additional features and operational flexibilities. For example, the apparatus can leverage the lower density cells for temporary memory storage, similar to cache memory, such as during higher demand workload or relatively frequent memory access. For such influx of writes, the apparatus can leverage the faster write speeds of the lower density cells to initially receive the data. Subsequently, the apparatus can move the initially received data into higher density cells (e.g., 12 bits stored in 12 SLCs into 4 TLCs or 3 QLCs).

However, different types of memory cells may behave differently. For example, the QLCs and the TLCs can have different charge loss patterns. In other words, different types of memory cells may experience charge loss at different rates. Conventional methods of measuring the charge loss require separate measurement circuits. Other conventional methods of tracking and calculating the charge loss requires relatively large tables used to track the write times and/or the storage durations for each cell or for each grouping of cells. Thus, such convention methods require additional resources, such as dedicated measurement circuits or designated storage space for the tracking tables, to be added for each type of memory.

Embodiments of the technology described herein can leverage the resources for one type of memory cells (e.g., QLCs) to compute/track the estimated charge loss for another type of memory cells (e.g., faster or lower density cells, such as TLCs). For example, the apparatus can include circuits and/or routines to measure one or more charge loss characteristics of QLC blocks. The apparatus can include or select one or more dummy wordlines (WLs) of QLCs as a proxy for representing and tracking the charge loss behavior of one or more TLC blocks. In estimating the charge loss of the TLC blocks, the apparatus can use the existing circuits/routines to measure the charge loss characteristics of the corresponding dummy WLs without directly measuring or tracking the TLC blocks. The apparatus can use a translation mechanism to convert the measured charge loss characteristics of the dummy WLs into the charge loss estimates of the TLC blocks. The apparatus can use the same type of resources to estimate and track the charge loss behavior for multiple types of memory cells instead of relying on separately dedicated resources for each types of cells.

FIG. 1 is a block diagram of a computing system 100 in accordance with an embodiment of the present technology. The computing system 100 can include a personal computing device/system, an enterprise system, a mobile device, a server system, a database system, a distributed computing system, or the like. The computing system 100 can include a memory system 102 coupled to a host device 104. The host device 104 can include one or more processors that can write data to and/or read data from the memory system 102. For example, the host device 104 can include an upstream central processing unit (CPU).

The memory system 102 can include circuitry configured to store data (via, e.g., write operations) and provide access to stored data (via, e.g., read operations). For example, the memory system 102 can include a persistent or non-volatile data storage system, such as a NAND-based Flash drive system, a Solid-State Drive (SSD) system, a SD card, or the like. In some embodiments, the memory system 102 can include a host interface 112 (e.g., buffers, transmitters, receivers, and/or the like) configured to facilitate communications with the host device 104. For example, the host interface 112 can be configured to support one or more host interconnect schemes, such as Universal Serial Bus (USB), Peripheral Component Interconnect (PCI), Serial AT Attachment (SATA), or the like. The host interface 112 can receive commands, addresses, data (e.g., write data), and/or other information from the host device 104. The host interface 112 can also send data (e.g., read data) and/or other information to the host device 104.

The memory system 102 can further include a memory controller 114 and a memory array 116. The memory array 116 can include memory cells that are configured to store a unit of information. The memory controller 114 can be configured to control the overall operation of the memory system 102, including the operations of the memory array 116.

In some embodiments, the memory array 116 can include a set of NAND Flash devices or packages. Each of the packages can include a set of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate a Vt of the cell. For example, a SLC can be programmed to a targeted one of two different data states, which can be represented by the binary units 1 or 0. Also, some flash memory cells can be programmed to a targeted one of more than two data states. MLCs may be programmed to any one of four data states (e.g., represented by the binary 00, 01, 10, 11) to store two bits of data. Similarly, TLCs may be programmed to one of eight (i.e., $1^3$) data states to store three bits of data, and QLCs may be programmed to one of 16 (i.e., $1^4$) data states to store four bits of data.

Such memory cells may be arranged in rows (e.g., each corresponding to a word line 130) and columns (e.g., each corresponding to a bit line). The arrangements can further correspond to different groupings for the memory cells. For example, each word line 130 can correspond to one or more memory pages. Also, the memory array 116 can include memory blocks that each include a set of memory pages. In operation, the data can be written or otherwise programmed (e.g., erased) with regards to the various memory regions of the memory array 116, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

As an illustrative example, the apparatus 100 and the memory array 116 therein is described as having a group of first-type cells 132 having a higher density (e.g., QLCs) and a group of second-type cells 134 having a lower density (e.g., TLCs). In some embodiments, the second-type cells 134 can be permanently configured (via, e.g., one or more physical or structural traits) to have the lower density. In other embodiments, the second-type cells 134 can be physically or structurally configured to have a maximum capacity that matches the first-type cells 132, but have dynamically designated configuration to store fewer bits than the maximum capacity. The memory array 116 can include the first-type cells 132 and the second-type cells 134 together in one package. Within the one or more packages, the first-type cells 132 and the second-type cells 134 can be grouped into separate blocks. For example, a package in the memory array 116 can include one or more QLC blocks and one or more TLC blocks. Also, the memory array 116 can include more of the first-type cells 132 than the second-type cells 134.

In some embodiments, the apparatus 100 can use the first-type cells 132 for primary and/or longer-term storage and use the second-type cells 134 or a subset therein as dynamic transition memory 136. As an illustrative example, when the apparatus 100 is experiencing a higher usage (e.g., rapidly received write commands exceeding a threshold amount within a predetermined duration), the apparatus 100 can write the incoming data to the dynamic transition memory 136. Thus, the apparatus 100 can leverage the lower density and the increased operating speeds of the lower density cells to accommodate the relatively fast influx of data. At a later time, such as when the workload is decreased, the apparatus 100 can move the data stored in the dynamic transition memory 136 to the higher density first-type cells 132, thereby effectively compressing the received data into a smaller number of cells. The dynamic transition memory 136 can be selectively enabled based on one or more real-time measures that characterize the workload, such as valid data detected for garbage collection, one or more recognizable command patterns, remaining unoccupied instances of the second-type cells 134, or the like. The dynamic transition memory 136 can be separate from and in addition to fixed cache 138 (e.g., memory designated to provide the transitional storage or cache functions at all times).

While the memory array 116 is described with respect to the memory cells, it is understood that the memory array 116 can include other components (not shown). For example, the memory array 116 can also include other circuit components, such as multiplexers, decoders, buffers, read/write drivers, address registers, data out/data in registers, etc., for accessing and/or programming (e.g., writing) the data and for other functionalities.

As described above, the memory controller 114 can be configured to control the operations of the memory array 116. The memory controller 114 can include a processor 122, such as a microcontroller, special purpose logic circuitry (e.g., a field programmable gate array (FPGA), an application specific integrated circuit (ASIC), etc.), or other suitable processor. The processor 122 can execute instructions encoded in hardware, firmware, and/or software (e.g., instructions stored in controller-embedded memory 124 to execute various processes, logic flows, and routines for controlling operation of the memory system 102 and/or the memory array 116.

Further, the memory controller 114 can further include an array controller 128 that controls or oversees detailed or targeted aspects of operating the memory array 116. For example, the array controller 128 can provide a communication interface between the processor 122 and the memory array 116 (e.g., the components therein). The array controller 128 can function as a multiplexer/demultiplexer, such as for handling transport of data along serial connection to flash devices in the memory array 116.

Figure 2B:
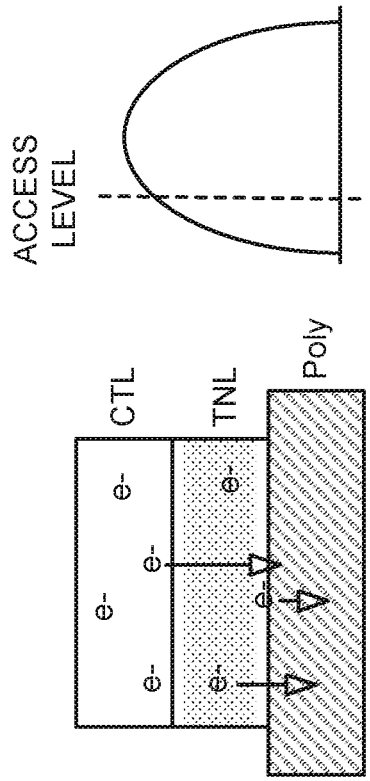
FIG. 2A and FIG. 2B are illustrations of charge loss.
Figure 2A:
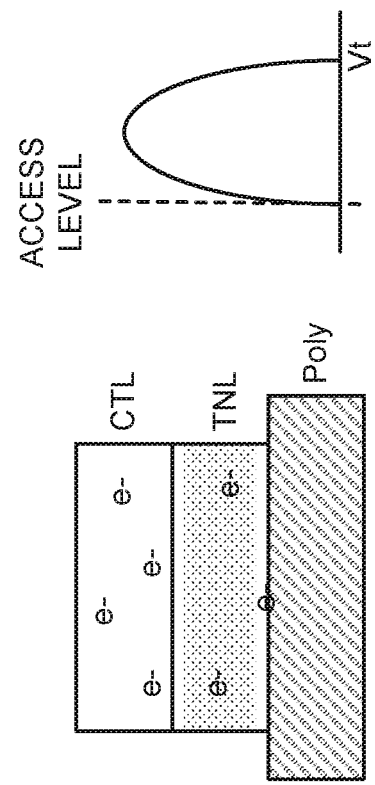

The memory controller 114, logic circuits within the memory array 116, corresponding firmware, or a combination thereof can implement a calibration mechanism 150 that adjusts one or more aspects of data access according to the state of the stored charges. To provide the context regarding the calibration mechanism 150, FIG. 2A and FIG. 2B are illustrations of charge loss. FIG. 2A illustrates charge distributions within a single cell (left) and Vt distribution of multiple cells (e.g., relative to a program-verify level; right) for a given bit value following initial programming operations. When a memory cell is programmed, at least a targeted amount of charges are stored in a charge trapping layer (CTL) to represent the corresponding bit value. During the write/programming operation, some charges may inadvertently occur or be placed in a tunneling layer (TNL) and/or a semiconductor substrate (poly) layer.

At the end of the write/programming operation, the memory system 102 can read or verify the result to ensure accuracy. Effectively, the memory system 102 can perform the verification to ensure that the stored charges exceed an access level (e.g., a program-verify (PV) level) that corresponds to the targeted bit value. Different cells may retain different amounts of charges in the CTL, thus resulting in a concaved shaped curve for the Vt distribution for cells storing a given bit value.

FIG. 2B illustrates the loss of charge with respect to both an individual cell and the Vt distribution. The charge loss can correspond to migrations of charges from the CTL to other locations within the memory cell, such as TNL and/or poly. Such displacement of the stored charges can effectively reduce the Vt. Since the memory cells can suffer or experience the charge loss at different rates, the Vt for cells storing a given bit value can change at different rates. Thus, the Vt distribution for a given bit value can decrease (e.g., shift to the left) and/or widen. Some of the cells having lower Vt at initial programming and/or experiencing faster/greater charge loss may shift below the PV level. Effectively, the memory cells with Vt values shifting below the PV level can experience data corruption and reflect a different bit value than the initially stored bit value.

Such charge loss behavior can differ for different types of cells (e.g., according to BPC densities). For example, QLCs and TLCs can have different charge loss traits or patterns. Accordingly, dedicated tracking and/or estimation of charge loss may be required for different types of cells or related memory blocks.

Referring back to FIG. 1, the calibration mechanism 150 (implemented via, e.g., the processor 122, logic internal to the memory array 116, software routines/instructions, firmware, or a combination thereof) can be configured to estimate and/or track the charge loss for the memory cells and control adjustments to the data processing (e.g., read-level voltage adjustments) accordingly. For memory arrays 116 having multiple types of cells (e.g., memory blocks with different BPCs, such as the first and second-type cells 132 and 134), the calibration mechanism 150 can have different tracking mechanisms. For example, the calibration mechanism 150 can include a first tracking mechanism 152 and a second tracking mechanism 160.

The first tracking mechanism 152 can include circuits, software instructions/routines, firmware, or a combination thereof configured to track the first-type cells 132 (e.g., blocks of memory with denser BPC configurations). The first tracking mechanism 152 can directly track or estimate the data storage behavior (e.g., the charge loss) of the first-type cells 132. In some embodiments, the first tracking mechanism 152 can maintain a first tracking list 152 that identifies blocks of the first-type cells 132 according to a charge loss amount, a corresponding offset amount for the read-level voltage, or the like. For example, the first tracking mechanism 152 can group or bin the QLC blocks according to the predetermined ranges of the charge loss amount or the corresponding offset amount.

In some embodiments, the first tracking mechanism 152 can include a first measurement mechanism 156 (e.g., dedicated circuitry and/or operating instructions) configured to directly measure one or more aspects of the charge loss in the targeted first-type cells 132. The apparatus 100 can be configured to trigger the first measurement mechanism 156 and obtain the resulting measurements for the blocks of the first-type cells 132. The resulting measurements can be used to identify the bin and the corresponding access adjustments 158 for each of the measured blocks (e.g., QLC blocks). Details regarding the first tracking mechanism 152 are described below.

The second tracking mechanism 154 can include circuits, software instructions/routines, firmware, or a combination thereof configured to track the second-type cells 134 (e.g., blocks of memory with less-dense BPC configurations). The second tracking mechanism 154 can indirectly track or estimate the data storage behavior (e.g., the charge loss) of the second-type cells 134 based on leveraging the first measurement mechanism 156. For example, the second tracking mechanism 154 can have a proxy access group 162 for a given set (e.g., one or more blocks) of the second-type cells 134. The proxy access group 162 can include a one or more instances of the access grouping 140 (e.g., one or more word lines) of the first-type cells 132 that serve as a proxy for the targeted block(s) of the second-type cells 134. The second tracking mechanism 154 can utilize the first measurement mechanism 156 to measure the storage trait (e.g., the charge loss) and generate a proxy measurement 164 that represent the storage state of the targeted memory block(s).

As an illustrative example, the apparatus 100 (via, e.g., the processor 122, logics and circuits in the memory array 116, the second tracking mechanism 154, or a combination thereof) can simultaneously manipulate (e.g., write to) the proxy access group 162 in the QLC block whenever a data operation (e.g., a write) is performed on one or more word lines in a corresponding TLC block. Following the manipulation, the second tracking mechanism 154 can utilize the first measurement mechanism 156 to directly measure the storage trait (e.g., the charge loss) of the proxy access group 162, thereby generating the proxy measurement 164. The second tracking mechanism 154 further compute a translated measure 168 based on processing the proxy measurement 164 according to a translation mechanism 168. The translated measure 168 can be a mapping or an estimate that reflects the state of the data in the targeted second-type cells 134 (e.g., TLCs) using the measured traits of the corresponding first-type cells 132 (e.g., QLCs). The translation mechanism 168 can include a process, an equation, a lookup table, or the like that reflects a predetermined relationship or linkage between charge loss patterns across the different cell types. In other words, the translation mechanism 168 can be configured to provide a charge loss estimate for cells having a second BPC under the same condition (e.g., retention time) in relation to measurable charge losses at cells having a first BPC.

In some embodiments, the apparatus 100 can use the translation mechanism 168 to derive and use the access adjustment 158 whenever a read is required at the second-type cells 134. For example, the apparatus 100 can (1) perform a measurement of the proxy access group 162 using the first measurement mechanism 156, (2) translate the measurement result to the translated measure 166 for a targeted set of TLCs, (3) derive an access adjustment 158 (e.g., a read-level voltage offset) based on the translated measure 166, and (4) apply the access adjustment 158, all in response to a read command targeting the TLC cells.

In other embodiments, the apparatus 100 can track a second tracking list 170 according to an update trigger 172 (e.g., a predetermined timing or condition). The second tracking list 170 can include the translated measure 166 for a set of the second-type blocks. The measures of the second tracking list 170 can be updated according to the updated trigger 172. For the update, the apparatus can measure the corresponding proxy access groups 162, perform the translations, and store the resulting translated measurements 166 and/or the access adjustment 158 similarly as the first tracking list 154. In response a read command targeting the second-type cells 134, the apparatus 100 can access the second tracking list 170 to derive or calculate the access adjustment 158 for the targeted cells and the use the resulting access adjustment 158 to perform the read operation.

FIG. 3 is an example translation mechanism 168 in accordance with an embodiment of the present technology. The translation mechanism 168 can identify a targeted pass voltage (VPASS) 302 used to group different values of the proxy measurement 164 of FIG. 1 or the corresponding levels of charge loss. For each bin or VPASS value, the translation mechanism 168 can identify various access adjustments 158 according to the predetermined voltage ranges or corresponding bit values. Accordingly, the apparatus 100 can use the translation mechanism 168 (e.g., as a lookup table) to determine translated measure 166 of FIG. 1, the access adjustment 168, or both appropriate for the measurement output 403.

In some embodiments, the translation mechanism 168 can include internal adjustments that reflect the translated measure 166 of FIG. 1, the access adjustment 168, or both. Accordingly, the translation mechanism 168 can be used to directly compute or output an adjusted access level based on the measurement output 403.

Figure 4:
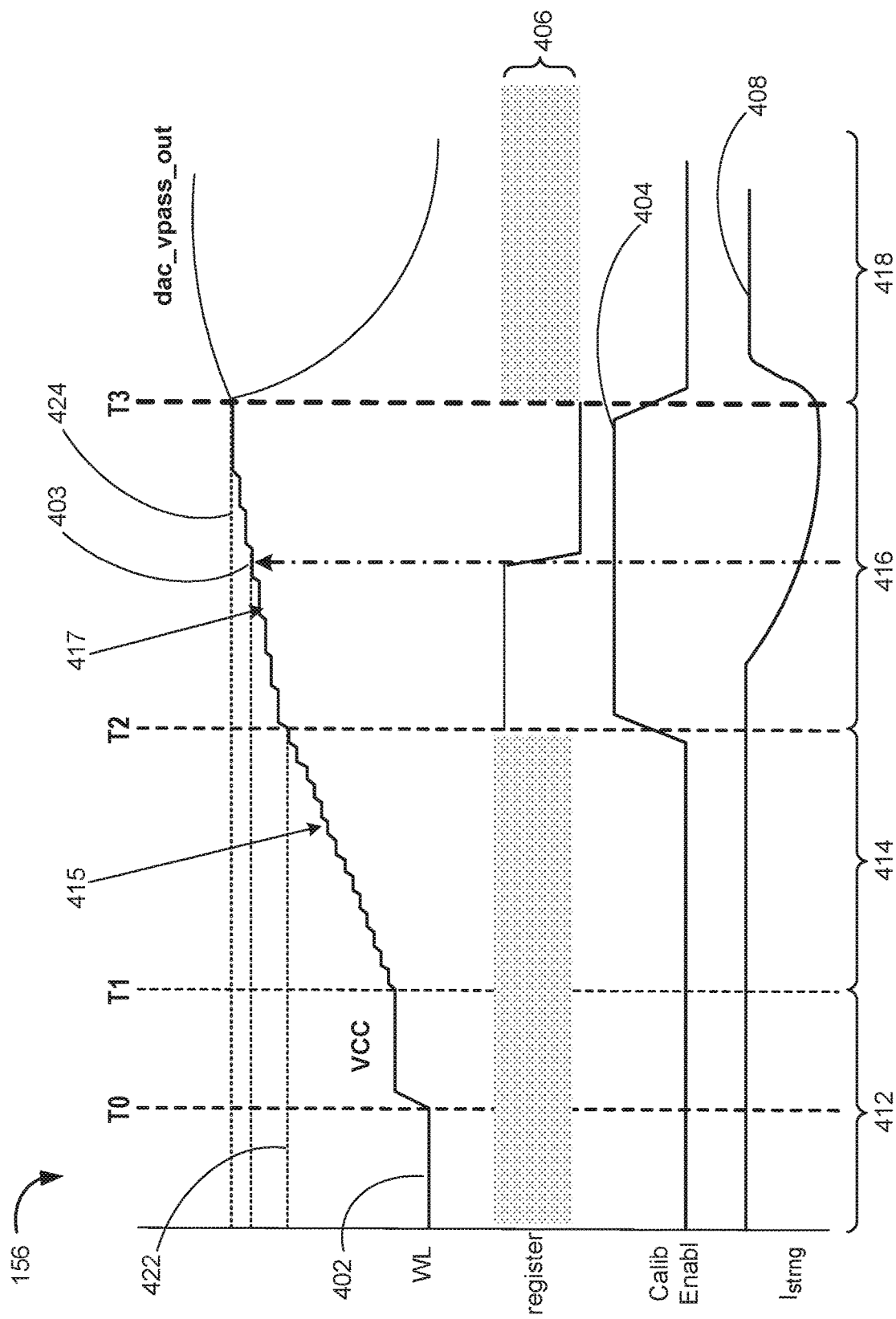
FIG. 4 is an illustration of a storage state measurement in accordance with an embodiment of the present technology.

FIG. 4 is an illustration of a storage state measurement (e.g., the first measurement mechanism 156 of FIG. 1) in accordance with an embodiment of the present technology. FIG. 4 can illustrate the steps taken or the details for implementing the first measurement mechanism 156. In other words, the first measurement mechanism 156 include the details or steps related to directly measure one or more aspects of the charge loss in the targeted cells (e.g., the first-type cells 132 of FIG. 1).

In directly measuring the one or more aspect, the first measurement mechanism 156 can be configured to vary, such as by incrementally increasing an access grouping voltage 402 (e.g., word line voltage, read level voltage, or the like) for the targeted access grouping 140 of FIG. 1. The apparatus 100 of FIG. 1 (via, e.g., the processor 122 of FIG. 1, a logic circuit in the memory array 116 of FIG. 1, software instructions or routines, firmware, or a combination thereof) can determine a measurement output 403 as a voltage level of the access grouping voltage 402 that satisfies a predetermined condition. For example, with a calibration enable 404 in an active state, the apparatus 100 can detect and record the access grouping voltage 402 when the stored data is initially read or disturbed, when a calibration register value 406 transitions, when a string current 408 (e.g., the current flowing through the access grouping 140 of FIG. 1; $I_{string}$) reaches a predetermined threshold, when a predetermined duration lapses, or the like. The measurement output 403 can correspond to the results of the first measurement mechanism 156 and the VPASS 302 of FIG. 3 recorded in the first tracking list 154 of FIG. 1. Also, the measurement output 403 can correspond to the proxy measurement 164 of FIG. 1 from directly measuring the proxy access group 162 of FIG. 1.

In some embodiments, the first measurement mechanism 156 can include a sequence of phases or portions. For example, the first measurement mechanism 156 can begin after establishing an initial state 412, such as with the bit lines set to a predetermined level (e.g., an analog source voltage level), word lines set to a voltage source level (e.g., VCC), or a combination thereof. Afterwards, the first measurement mechanism 156 can implement an initial ramping portion 414 that incrementally increases the access grouping voltage 402 according to an initial step size 415 (e.g., a predetermined increase amount and/or a duration) up to a measurement minimum 422. During the initial ramping portion 414, one or more bit lines can be precharged.

Once the access grouping voltage 402 reaches the measurement minimum 422, the first measurement mechanism 156 can implement a measurement portion 416. The measurement portion 416 can coincide with the active state of the calibration enable 404.

During the measurement portion 416, the apparatus 100 can incrementally increase the access grouping voltage 402 by a measurement step size 417 (e.g., a predetermined increase amount and/or a duration) that is different in voltage and/or duration than the initial step size 415. For example, the initial step size 415 can have comparatively larger voltage increments and shorter sustained duration to shorten the duration in establishing the measurement minimum 422 at the access grouping voltage 402. In comparison, the measurement step size 417 can be smaller voltage increment and/or longer sustained duration than the initial step size 415 to provide finer measurement granularities and/or sufficient measurement duration that increase the measurement accuracy.

While the iteratively/incrementally increasing the access grouping voltage 402, the apparatus 100 can monitor a measuring condition. The measuring condition can correspond to a read condition or a similar change in electrical equilibrium with respect to the access grouping 140 and the corresponding cells. The measuring condition can be represented by a transition in the calibration register value 406 and/or the string current 408 reaching a threshold level. The apparatus 100 can detect the level of the access grouping voltage 402 at the time of the measuring condition. The apparatus 100 can store the detected level as the measurement output 403.

In some embodiments, the apparatus 100 can continue increasing the access grouping voltage 402 after the measuring condition. For example, the apparatus 100 can continue the measurement portion 416 until the access grouping voltage 402 reaches an adjusted access level 424. The apparatus 100 can access a predetermined lookup table to determine an offset value that corresponds to the measurement output 403 while continuing to incrementally increase the measurement portion 416. Accordingly, the apparatus 100 can dynamically calculate (e.g., while incrementally increasing the measurement portion 416) the adjusted access level 424 as a combination of the determined offset value and the measurement output 403. The apparatus 100 can stop the measurement portion 416 and the incremental increase in the access grouping voltage 402 when the voltage reaches or exceeds the adjusted access level 424. Alternatively, the apparatus 100 can issue an interrupt to reset the access grouping voltage 402, such as in response to an error condition or other reset conditions.

The apparatus 100 can implement a full sense portion 418 after the measurement portion 416. During the full sense portion 418, the apparatus 100 can prepare for a sense, such as by operating a sense amplifier, to detect the amount of charges stored in the corresponding memory cells. Following the full sense portion 418, the apparatus 100 can reset the access grouping voltage 402 and other related conditions and return to a reset state (e.g., before T0).

In other embodiments, the apparatus 100 can implement the first measurement mechanism 156 by applying a voltage pulse and measuring the reaction at the memory cells. For example, the apparatus 100 can determine a quantity of bits/memory cells with Vt greater than the applied voltage pulse. Accordingly, the apparatus 100 can determine the highest Vt that can be used to compute the measurement output 403.

As described in further detail herein, the apparatus 100 can use the first measurement mechanism 156 for the second tracking mechanism 160. The apparatus 100 can identify the proxy access group 162 associated with one or more targeted TLC blocks. For example, the apparatus 100 select a dummy word line with QLC mode in the targeted TLC block. The apparatus 100 can update the read offset bin adjustment (e.g., the access adjustment 158 of FIG. 1) for the targeted TLC block by determining the measurement output 403 (e.g., the proxy measurement 164 representative of the charge loss) of the dummy word line and translating the measurement output 403 into the translated measure 166 of FIG. 1 according to the translation mechanism 168. In some embodiments, the apparatus 100 can update the read offset bin without assessing a timer (e.g., a timer used to track an elapsed duration since last write/refresh), a temperature, or both.

In some embodiments, the apparatus 100 can use the update trigger 172 of FIG. 1 that initiates based on need. For example, the update trigger 172 can initiate the first measurement mechanism 156 during read error handling, media scan, periodic scan, or the like.

Figure 5:
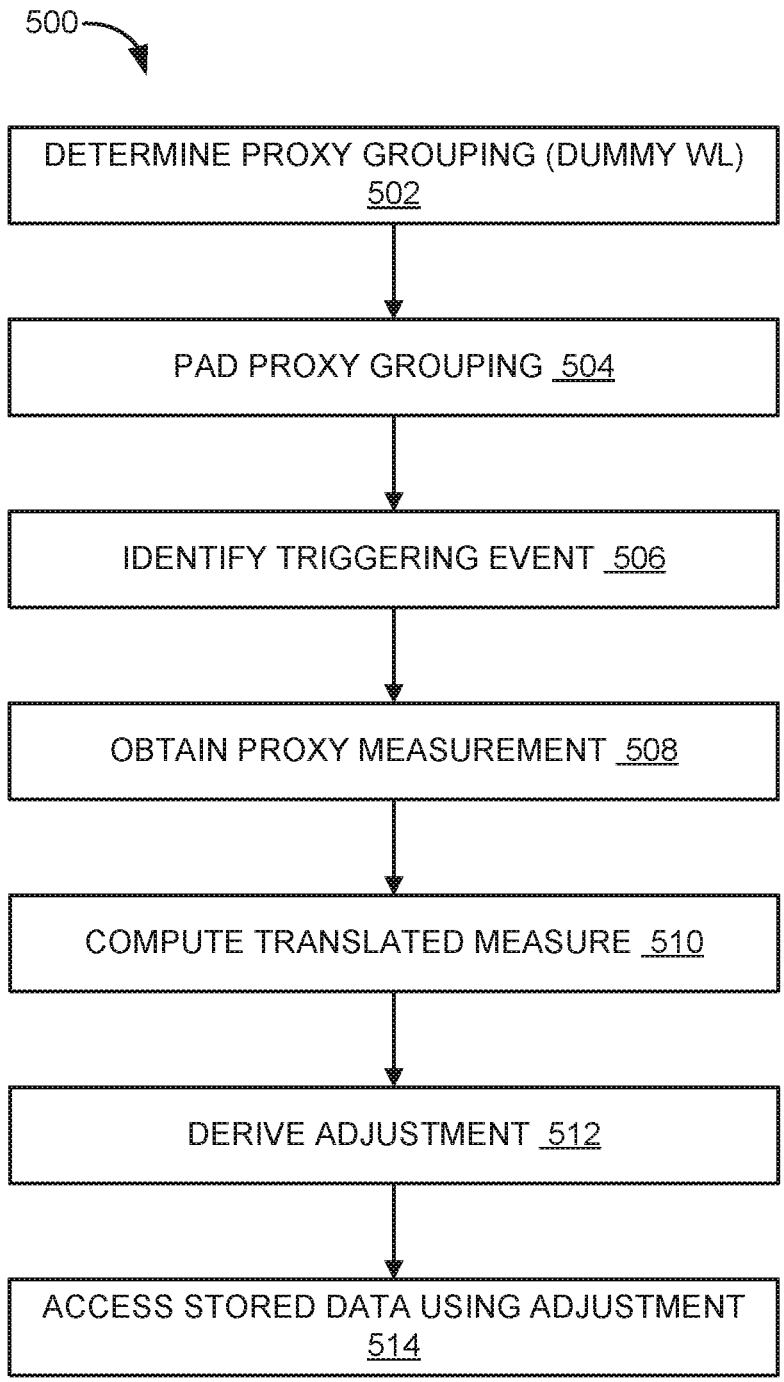
FIG. 5 is a flow diagram illustrating an example method of manufacturing/operating an apparatus in accordance with an embodiment of the present technology.

FIG. 5 is a flow diagram illustrating an example method 500 of operating an apparatus (e.g., the apparatus 100, the memory system 102, the memory controller 114, the memory array 116, and/or other circuits illustrated in FIG. 1) in accordance with an embodiment of the present technology. The method 500 can be for implementing (via, e.g., the processor 122 of FIG. 1, logic within the memory array 116, other logic circuits, or a combination thereof) the calibration mechanism 150 of FIG. 1, including the second tracking mechanism 160 of FIG. 1. In other words, the method 500 can be for computing and/or tracking the translated measure 166 that reflects the charge loss and the corresponding storage state of the targeted cells (e.g., the first-type cells 132 of FIG. 1 including the QLCs), such as the less dense second-type cells 134 of FIG. 1 (e.g., TLCs).

At block 502, the apparatus 100 can determine a proxy grouping of the first-type cells 132 of FIG. 1. As an illustrative example, the memory array 116 (e.g., a Flash memory array) can include the first-type cells 132 and the second-type cells 134. In some embodiments, the first-type cells 132 and the second-type cells 134 can be included within one block. The memory block can include the second-type cells 134 configured to store a reduced number of BPC that is less than their maximum BPC. For example, the memory block can include QLC second-type cells 134 that are dynamically configured (e.g., "on the fly" or during deployed usage of the memory array 116) to store three or less bits, thereby operating as TLCs, MLCs, or SLCs. The apparatus 100 can operate the block with reduced storage density to decrease operation times (e.g., write and read durations) in comparison to the larger or maximum bit density configurations. For example, the apparatus 100 can utilize the second-type cells 134 to store data transitionally, similar to cache memory.

Given the higher-capacity default configuration, the apparatus 100 can include the first tracking mechanism 152 of FIG. 1 configured to track the charge loss for cells operating at one BPC (e.g., the maximum capacity). The apparatus 100 can retain the first-type cells 132 as the proxy access group 162 of FIG. 1 to model the charge loss for the second-type cells 134 in the same block. For example, within the block, the apparatus 100 (via, e.g., the processor 122, one or more logic circuits in the memory array 116, or a combination thereof) can determine a set of cells (along, e.g., one dummy or proxy word line) to continue operating as the higher/maximum storage capacity and function as the proxy access group 162. In comparison, the remaining cells (e.g., the second-type cells 134) can store content or payload data and/or be connected to other/separate word lines. The determined proxy grouping can allow the first tracking mechanism 152 to track or estimate the charge loss for the second-type cells 134 in the same block over time (e.g., degradations in the accessible or content data within the block).

In other embodiments, the memory block can include a reserved word line. The apparatus 100 can utilize the reserved word line as the first-type cells 132 and the proxy access group 162. For example, the apparatus 100 can implement the proxy access group 162 by programming the memory cells connected to the reserved word line into QLC mode. Accordingly, the apparatus 100 can use the reserved word line to track charge loss using the first tracking mechanism 152.

At block 504, the apparatus 100 can pad the proxy grouping (e.g., the first-type cells 132 or the proxy access group 162). For example, the apparatus 100 can pad the proxy access group 162 by storing predetermined data values to establish an initial state for tracking and observing the charge loss over time. In some embodiments, the apparatus 100 can pad the proxy access group 162 when the corresponding memory block (e.g., a first word line therein) is written or refreshed.

At block 506, the apparatus 100 can identify a triggering event for estimating charge loss. For example, the apparatus 100 can identify satisfaction of the update trigger 172 of FIG. 1. When the triggering event is identified, the apparatus 100 can implement the first tracking mechanism 152 to ultimately compute and generate an estimated charge loss for the memory block (e.g., the second-type cells 134 therein) and an appropriate amount of adjustment necessary to access the stored data in their degraded state. In some embodiments, the apparatus 100 can initiate the charge loss estimation during a reading error handling process, a media scan, a periodic scan, or a combination thereof.

At block 508, the apparatus 100 can obtain the proxy measurement 164 (e.g., the measurement output 403 of FIG. 4) that model charge losses at the second-type cells 134. In other words, the apparatus 100 can generate the measurement output 403 from implementing the first tracking mechanism 152 to directly operate on the first-type cells 132 (e.g., the proxy access group 162 in the block). The obtained proxy measurement 164 can include or represent the charge loss (e.g., a change or a degradation away from the initial state) over time at the first-type cells 132.

The apparatus 100 can obtain the proxy measurement 164 based on incrementally increasing the access grouping voltage 402 of FIG. 4. In some embodiments, the apparatus 100 can incrementally increase the access grouping voltage 402 on the proxy word line along with other (e.g., all) word lines in the memory block. The apparatus 100 can use the initial step size 415 of FIG. 4 to bring the word line voltages up to the measurement minimum 422 of FIG. 4. Afterwards, the apparatus 100 can use the measurement step size 417 of FIG. 4 to raise the word line voltages beyond or above the measurement minimum 422. During the iterative/incremental increase, the apparatus 100 can monitor one or more circuits in the memory array 116 to detect a predetermined reaction related to the first-type cells 132. In response to detecting the predetermined reaction, the apparatus 100 can determine the corresponding voltage of the access grouping voltage 402 as the measurement output 403. The apparatus 100 can use the measurement output 403 as the proxy measurement 164 that models or represents the charge loss at the second-type cells 134 in the memory block. The apparatus 100 can continue to incrementally increase the access grouping voltage 402 during and after determining the measurement output 403 and in parallel to other steps described below.

At block 510, the apparatus 100 can compute the translated measure 166 based on the proxy measurement 164 (e.g., the measurement output 403). For example, the apparatus 100 can compute the translated measure 166 using the measurement output 403 as an input for the translation mechanism 168 of FIG. 1 that represents a relationship between charge losses at the first-type cells 132 and the second-type cells 134. The translated measure 166 can include an estimate of charge loss at the second-type cells 134.

At block 512, the apparatus 100 can derive the access adjustment 158 based on the translated measure 166. The apparatus 100 can derive the access adjustment 158 for adjusting a read-level voltage for the second-type cells 134 to account for the charge loss. Accordingly, the apparatus 100 can derive the access adjustment 158 using the existing first tracking mechanism 152 and without a charge loss tracking/estimation separately dedicated to the second-type cells 134. For example, the apparatus 100 can derive the access adjustment 158 without or instead of tracking a storage duration specific to or additionally for the second-type cells 134, such as without adjusting for temperatures during storage at the second-type cells 134, and/or without directly measuring the charge loss at the second-type cells 134.

In some embodiments, the method 500 can combine steps described in blocks 510 and 512 into one step. For example, the translation mechanism 168 can internally include the translated measure 166 and directly output the access adjustment 158 appropriate for the measurement output 403.

At block 514, the apparatus 100 can access data stored at the second-type cells 134 using the access adjustment 158. The apparatus 100 can compute the adjusted access level 424 based on combining the address adjustment 158 and the translated measure 166. In some embodiments, the translation mechanism 168 can internally include the translated measure 166 and the access adjustment 158, thereby directly outputting the adjusted access level 424 according to the measurement output 403.

The apparatus 100 can use the adjusted access level 424 to read from the second-type cells 134. In some embodiments, the incremental increases in the word line voltage can continue past determination of the measurement output 403. During or in parallel to such incremental increase, the apparatus 100 can perform the necessary computations for the adjusted access level 424. Effectively, the apparatus 100 can increase the word line voltages for the second second-type cells 134 up to the adjusted access level 424. The apparatus 100 can operate the sense amplifier using the adjusted access level 424 to read the second-type cells 134.

Figure 6:
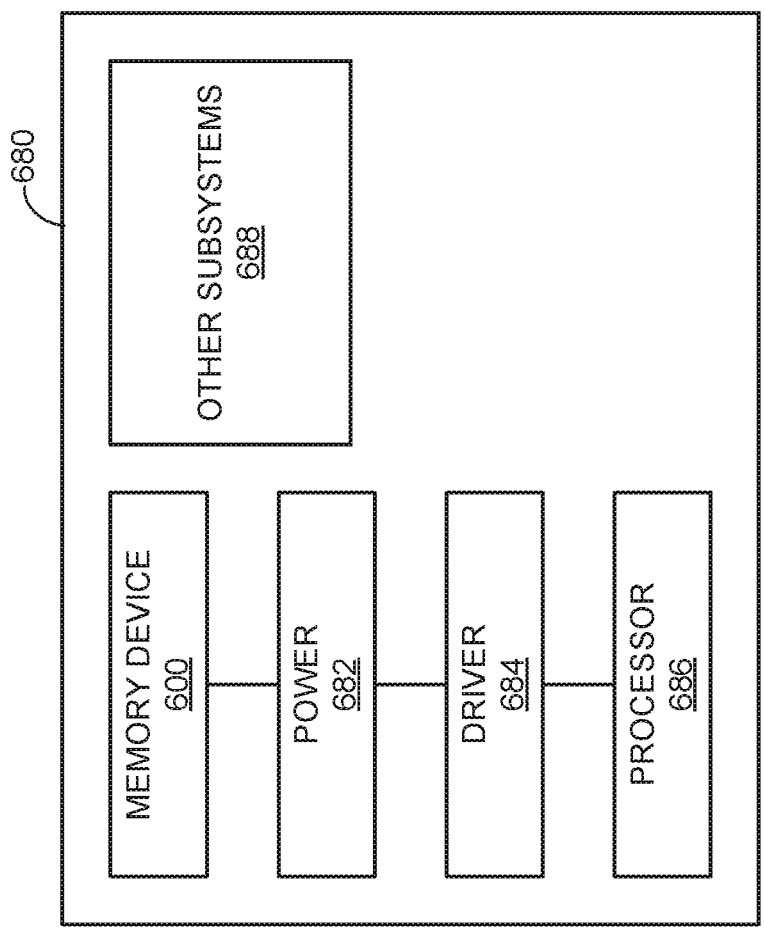
FIG. 6 is a schematic view of a system that includes an apparatus in accordance with an embodiment of the present technology.

FIG. 6 is a schematic view of a system that includes an apparatus in accordance with embodiments of the present technology. Any one of the foregoing apparatuses (e.g., memory devices) described above with reference to FIGS. 1-5 can be incorporated into any of a myriad of larger and/or more complex systems, a representative example of which is system 680 shown schematically in FIG. 6. The system 680 can include a memory device 600, a power source 682, a driver 684, a processor 686, and/or other subsystems or components 688. The memory device 600 can include features generally similar to those of the apparatus described above with reference to one or more of the FIGS, and can therefore include various features for performing a direct read request from a host device. The resulting system 680 can perform any of a wide variety of functions, such as memory storage, data processing, and/or other suitable functions. Accordingly, representative systems 680 can include, without limitation, hand-held devices (e.g., mobile phones, tablets, digital readers, and digital audio players), computers, vehicles, appliances and other products. Components of the system 680 may be housed in a single unit or distributed over multiple, interconnected units (e.g., through a communications network). The components of the system 680 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of NAND Flash devices. Apparatuses configured in accordance with other embodiments of the present technology, however, can include other types of suitable storage media in addition to or in lieu of NAND Flash devices, such as, devices incorporating NOR-based non-volatile storage media (e.g., NAND flash), magnetic storage media, phase-change storage media, ferroelectric storage media, dynamic random access memory (DRAM) devices, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or performance occurring during operation, usage, or deployment of a corresponding device, system or embodiment, and after or while running manufacturer's or third-party firmware. The dynamically occurring processes, functions, actions or performances can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to one or more of the FIGS. described above.

We claim:

1. A memory device, comprising:
   a memory array including non-transient rewritable memory cells grouped into blocks and configured to store charges representative of stored data,
      wherein a memory block is configured to include second-type cells designated to store a second number of bits per cell, the second-type cells are configured to store accessible data, and
      wherein the memory block includes a word line configured as first-type cells that are designated to store a first number of bits per cell greater than the second number of bits, the first-type cells configured as a proxy for modeling charge loss in the second-type cells; and
   a logic circuit coupled to the memory array and configured to:
      pad the first-type cells with predetermined data values for observing charge loss over time, wherein the first-type memory cells are padded to represent storage states of the second-type cells;
      obtain a measurement output directly from operating on the first-type cells;
      compute a translated measure for the second-type cells using the measurement output and a translation mechanism,
         wherein the translated measure includes an estimate of charge loss at the second-type cells, and
         wherein the translation mechanism represents a relationship between charge losses at the first-type cells and the second-type cells; and
      derive an access adjustment based on the translated measure, wherein the access adjustment is for adjusting a read-level voltage to account for the charge loss at the second-type cells in reading from the second-type cells.

2. The memory device of claim 1, wherein the second-type cells are triple-level cells (TLCs) and the first-type cells are quad-level cells (QLCs).

3. The memory device of claim 1, wherein the second-type cells (1) have a maximum storage capacity greater than the first number of bits and (2) are dynamically configured to store less than the maximum capacity to decrease write time in comparison to the first-type cells.

4. The memory device of claim 1, wherein the logic circuit is configured to obtain the measurement output and compute the translated measure during a reading error handling process, a media scan, a periodic scan, or a combination thereof.

5. The memory device of claim 1, wherein the logic circuit is configured to derive the access adjustment (1) without tracking a storage duration at the second-type cells, (2) without directly measuring the charge loss at the second-type cells, (3) without adjusting for temperature, or a combination thereof.

6. A method of operating a memory device that includes rewritable memory cells configured to store charges representative of stored data, the method comprising:
   determining first-type memory cells configured to have a first storage density, wherein the first-type memory cells are configured as proxy for second-type memory cells having a second storage density;
   padding the first-type memory cells with predetermined data values for observing charge loss over time;
   obtaining a measurement output directly from operating on the first-type cells, wherein the measurement output reflects charge loss at the first-type cells;
   computing a translated measure based on the measurement output and a translation mechanism that maps measured charge losses at the first-type cells to estimated charge losses at the second-type cells; and
   deriving an access adjustment based on the translated measure, wherein the access adjustment is for adjusting a read-level voltage for the second-type cells.

7. The method of claim 6, wherein obtaining the measurement output includes:
   incrementally increasing an access grouping voltage on the first-type cells;
   determining the measurement output as the access grouping voltage that causes a predetermined reaction related to the first-type cells;
   further comprising:
   computing an adjusted access level based on combining the access adjustment with the translated measure; and
   reading the second-type cells using the adjusted access level.

8. The method of claim 7, wherein:
   the first-type cells and the second-type cells comprise a memory block,
      wherein the first-type cells are connected to a proxy word line;
      wherein the first storage density is a maximum storage density for the memory block;
      wherein the second-type cells are (1) connected to separate storage word lines and (2) dynamically configured to store the second storage density that is less than the maximum storage density;
   incrementally increasing the access grouping voltage includes continuing to incrementally increase the access grouping voltage during and after determining the measurement output and while computing the translated measure, deriving the access adjustment, and computing the adjusted access level;
   reading the second-type cells includes:

incrementally increasing voltages on the storage word lines simultaneously as the access grouping voltage; and increasing the voltages at the storage word lines at least up to the adjusted access level.

9. The method of claim 8, wherein:

the maximum storage density for the memory block is four bits per cell; and the second-type cells are QLCs that are dynamically configured to operate as TLCs to reduce read and write times.

10. The method of claim 7, wherein incrementally increasing the access grouping voltage includes:

increasing the access grouping voltage up to a measurement minimum according to an initial step size; and increasing the access grouping voltage over and beyond the measurement minimum using a measurement step size that has a smaller magnitude, a longer sustain duration, or both in comparison to the first step size.

11. A memory device, comprising:

rewritable memory cells grouped into blocks and configured to store charges representative of stored data, the memory cells including first-type cells and second-type cells designated to store different numbers of bits in each cell; and a logic circuit coupled to the rewritable memory cells and configured to:

determine a proxy access group that includes a set of the first-type cells configured to model charge loss for the second-type cells;

pad the proxy access group to establish an initial state for tracking charge levels at the second-type cells;

obtain a measurement output directly from the proxy access group, wherein the measurement output represents charge loss from the initial state over time; and using the measurement output, derive an access adjustment for reading the second-type cells based on translating the measurement output to represent an estimated charge loss at the second-type cells.

12. The memory device of claim 11, wherein:

the rewritable memory cells are Flash memory cells;

the second-type cells are triple-level cells (TLCs); and the first-type cells are quad-level cells (QLCs).

13. The memory device of claim 11, wherein the second-type cells (1) have a maximum storage capacity greater than the first number of bits and (2) are configured to store less than the maximum capacity to decrease write time.

14. The memory device of claim 13, wherein:

the second-type cells comprise a memory block and are dynamically configured to store less than the maximum capacity; and the proxy access group is a word line within the memory block configured to operate as the first-type cells.

15. The memory device of claim 11, wherein the logic circuit is configured to derive the access adjustment instead of (1) tracking a storage duration at the second-type cells, (2) directly measuring the charge loss at the second-type cells, (3) adjusting for temperature, or a combination thereof.

16. The memory device of claim 11, wherein the logic circuit is configured to obtain the measurement output and compute the translated measure during a reading error handling process, a media scan, a periodic scan, or a combination thereof.

17. The memory device of claim 11, wherein the logic circuit is configured to:

incrementally increase an access grouping voltage on the proxy access group;

determine the measurement output as the access grouping voltage that causes a predetermined reaction related to the first-type cells;

compute a translated measure based on the measurement output and a translation mechanism that maps measured charge losses at the first-type cells to charge loss estimations for the second-type cells;

derive the access adjustment based on the translated measure;

compute an adjusted access level based on combining the access adjustment with the translated measure; and read the second-type cells using the adjusted access level.

18. The memory device of claim 17, wherein:

the first-type cells and the second-type cells comprise a memory block, wherein the proxy access group includes the first-type cells connected to a proxy word line;

wherein the first storage density is a maximum storage density for the memory block;

wherein the second-type cells are (1) connected to a separate storage word line and (2) dynamically configured to store the second storage density that is less than the maximum storage density;

the logic circuit is further configured to:

continue incrementally increasing the access grouping voltage during and after determining the measurement output and in parallel to (1) computing the translated measure, (2) deriving the (1) access adjustment, and computing the adjusted access level;

reading the second-type cells based on:

incrementally increasing voltage on the storage word line matching the access grouping voltage; and increasing the voltages at the storage word line at least up to the adjusted access level.

19. The memory device of claim 18, wherein:

the maximum storage density for the memory block is four bits per cell; and the second-type cells are QLCs dynamically configured to store three bits or less per cell to reduce read and write times.

20. The memory device of claim 17, wherein the logic is further configured to incrementally increase the access grouping voltage based on:

increasing the access grouping voltage up to a measurement minimum according to an initial step size; and increasing the access grouping voltage over and beyond the measurement minimum using a measurement step size that has a smaller magnitude, a longer sustain duration, or both in comparison to the first step size.

* * * * *